(12) United States Patent
Kudtarkar et al.

(10) Patent No.: US 9,769,001 B2
(45) Date of Patent: Sep. 19, 2017

(54) DE-MAPPING TECHNIQUE WITH PROVISION OF PROBABILITY INFORMATION INCLUDING A PRIORI INFORMATION

(71) Applicant: Telefonaktiebolaget L M Ericsson (publ), Stockholm (SE)

(72) Inventors: Swapnil Kudtarkar, Ulm (DE); Ansgar Scherb, Lauf an der Pegnitz (DE); Thomas Wagner, Schwabach (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/786,442

(22) PCT Filed: Apr. 26, 2013

(86) PCT No.: PCT/EP2013/058780
§ 371 (c)(1),
(2) Date: Oct. 22, 2015

(87) PCT Pub. No.: WO2014/173460
PCT Pub. Date: Oct. 30, 2014

(65) Prior Publication Data
US 2016/0105303 A1    Apr. 14, 2016

(51) Int. Cl.
*H04L 27/06*    (2006.01)
*H04L 27/26*    (2006.01)
(Continued)

(52) U.S. Cl.
CPC ........ *H04L 27/2649* (2013.01); *H04L 25/067* (2013.01); *H04L 27/2647* (2013.01); *H04L 27/38* (2013.01); *H04L 1/005* (2013.01)

(58) Field of Classification Search
CPC ....... H04L 1/005; H04L 25/067; H04L 1/006; H04L 1/0071; H04L 25/03178;
(Continued)

(56) References Cited

U.S. PATENT DOCUMENTS

2004/0240590 A1*  12/2004  Cameron  ........... H03M 13/1102
                                                     375/340
2009/0060094 A1*   3/2009  Jung     ........... H04B 1/69
                                                     375/340
(Continued)

FOREIGN PATENT DOCUMENTS

EP    0998087 A1    5/2000

OTHER PUBLICATIONS

Axell, Christian et al., "Efficient WiMAX Receiver Implementation on a Programmable Baseband Processor", Linkoping University, Nov. 1, 2006, 1-93.
(Continued)

*Primary Examiner* — Khanh C Tran
(74) *Attorney, Agent, or Firm* — Murphy, Bilak & Homiller, PLLC

(57) ABSTRACT

A technique for de-mapping a point in a constellation diagram into a bit sequence is presented. The de-mapping provides for each bit of the bit sequence an output value with a sign of the output value indicating a bit value and a magnitude of the output value indicating probability information in the form of a distance to a decision boundary in the constellation diagram. A method aspect of the technique presented herein comprises receiving a signal indicative of a constellation point, wherein the constellation point represents a bit sequence having a most significant bit and at least one next significant bit, deriving a first output value for the most significant bit based on a first decision boundary, receiving a priori information, and deriving a second output value for the next significant bit based on the first output value, the a priori information and a second decision boundary.

17 Claims, 9 Drawing Sheets

(51) Int. Cl.
*H04L 25/06* (2006.01)
*H04L 27/38* (2006.01)
*H04L 1/00* (2006.01)

(58) Field of Classification Search
CPC . H04L 27/2647; H04L 27/2649; H04L 27/38; H03M 13/1102; H03M 13/275; H03M 13/3927
See application file for complete search history.

(56) References Cited

U.S. PATENT DOCUMENTS

2010/0183065 A1* 7/2010 Siti ............... H04L 25/067 375/233
2012/0257692 A1* 10/2012 Yeung ............ H04L 25/061 375/320

OTHER PUBLICATIONS

Axnas, Johan, "Technical Note on Hard and Soft SIC Performance for 2×2 and 4×4 MIMO on LTE Downlink", Ericsson Technical Note, Sep. 14, 2010, 1-28.
Land, Ingmar et al., "Computation of Symbol-Wise Mutual Information in Transmission Systems with LogAPP Decoders and Application to Exit Charts", Information and Coding Theory Lab, Faculty of Engineering, University of Kiel, Kaiserstr, 2004, 1-8.
Raju, M. S. et al., "BER Analysis of QAM with Transmit Diversity in Rayleigh Fading Channels", IEEE GLOBECOM, 2003, 641-645.
Ramesh, R., "Generating Bit-Level Soft Information for Faded 16-QAM", Ericsson Internal, Jan. 3, 1997, 1-6.
Ten Brink, Stephan et al., "Iterative Demapping and Decoding for Multilevel Modulation", IEEE Globecom, 1998, 579-584.
Xie, Qiuliang et al., "Bit-Interleaved LDPC-Coded Modulation with Iterative Demapping and Decoding", IEEE 69th Vehicular Technology Conference, Apr. 2009, 1-6.

* cited by examiner

DE-MAPPING TECHNIQUE WITH PROVISION OF PROBABILITY INFORMATION INCLUDING A PRIORI INFORMATION

TECHNICAL FIELD

The present disclosure generally relates to a technique for de-mapping a point in a constellation diagram into a bit sequence, wherein for each bit of the bit sequence reliability information is provided. The technique may be implemented in the form of a method, a computer program product or an apparatus.

BACKGROUND

The 3$^{rd}$ Generation Partnership Project (3GPP) and other standardization bodies have long been working on telecommunications systems that provide peak data rates of 100 Mbps and beyond. As one the example, the 3GPP Long Term Evolution (LTE) standard can be mentioned. In LTE, high peak data rates are achieved by sophisticated mechanisms such as link adaptation and Hybrid Automatic Retransmission Request (HARQ) schemes.

In short, link adaptation allows a base station to select modulation and coding parameters individually per user terminal based on the current channel quality. In LTE, link adaption is supported by Orthogonal Frequency Division Multiple Access (OFDMA) in the downlink and Single Carrier FDMA (SC-FDMA) in the uplink. An LTE OFDM downlink signal comprises multiple orthogonal sub-carriers that can be addressed to different user terminals.

HARQ schemes enhance the acknowledgement, retransmission and time-out features of conventional ARQ schemes with Forward Error Correction, FEC, coding (using, for example, so-called Turbo Codes) and with the transmission of error detection information (such as Cyclic Redundancy Check bits). HARQ schemes improve system throughput by combining, rather than discarding, information received via previous erroneous transmission attempts with information received with a current attempt.

FIG. 1 illustrates a block diagram of components of an exemplary OFDM receiver 10 that supports HARQ. The receiver 10 comprises a Fast Fourier Transformer (FFT) 20, a frequency domain equalizer 30, a de-mapper 40 and a channel decoder 50.

An OFDM time domain signal received via a channel is converted by the FFT 20 into the frequency domain to extract the orthogonal sub-carriers. Downstream of the FFT 20 the equalizer 30 individually compensates the channel impact for each sub-carrier in the frequency domain. To this end each sub-carrier is processed based on an estimated channel frequency response. Then, the de-mapper 40 (also referred to as demodulator) reproduces the digital information contained in the output signal of the equalizer 30 by de-mapping points in a constellation diagram into bit sequences. This process is also referred as demodulation and reverses the mapping, or modulation, performed on a transmitter side. The channel decoder 50 decodes the output of the de-mapper 40 and generates sequences of decoded bits as shown in FIG. 1.

During OFDM signal generation a transmitter maps, or modulates, digital information onto sub-carriers for transmission via the channel. Sub-carrier modulation is performed by varying on or both of a phase and an amplitude of a sub-carrier in accordance with the digital information to be transmitted, giving rise to both In-phase (I) and Quadrature (Q) sub-carrier waves.

By way of modulation, binary data are grouped into sequences of i bits that constitute one symbol. Hence, each symbol corresponds to one of $2^i$ possible points, and the total number of points is referred to as a constellation. A constellation can be represented in the form of a constellation diagram in an I/Q plane, wherein the values of I and Q may be interpreted as the real and imaginary parts, respectively.

Now returning to the receiver 10 of FIG. 1, the de-mapper 40 is in charge of de-mapping a point in the constellation diagram into the underlying symbol, or bit sequence. A de-mapping scenario for an exemplary Quadrature Amplitude Modulation (QAM) constellation with 16 points in the I/Q plane ("16-QAM") and a resulting bit sequence $b_3b_2b_1b_0$ having a length of i=4 is described in Ch. Axell and M. Brogsten, "Efficient WiMAX Receiver Implementation on a Programmable Baseband Processor", LiTH-ISY-EX-06/3858-SE, Linköping University (2006-10-12), section 7.5.1 (http://www.ep.liu.se/).

FIG. 2 illustrates the 16-QAM de-mapping procedure for the Most Significant Bit (MSB) $b_3$ of the bit sequence $b_3b_2b_1b_0=0000_2$. This specific bit sequence corresponds to constellation point [I, Q]=[1, 1] in the 16-QAM I/Q plane.

In FIG. 2, the output signal of the equalizer 30 is marked by "X". As can be seen, the marking "X" does not fully coincide with the constellation point [1, 1] due to channel variations and other imperfections. For this reason a decision procedure is performed by the de-mapper 40 to identify a point in the constellation diagram that corresponds to the marking "X". This decision procedure is based on repeatedly applying decision boundaries in the constellation diagram. The exemplary decision boundary illustrated in FIG. 2 for MSB $b_3$ is selected to coincide with the Q axis (i.e., an axis defined by I=0). If the received in-phase signal portion is larger than zero (I>0) the transmitted symbol can be assumed to be located in the right half plane in FIG. 2, where all symbols with MSB $b_3$=0 are located. Accordingly, the boundary decision illustrated in FIG. 2 results in $b_3$=0. Similar boundary decisions (but using other decision boundaries) are performed for the remaining bits $b_2$, $b_1$, and $b_0$.

The decision procedure outlined above only provides the bit sequence $b_3b_2b_1b_0$ with no additional information about the reliability, or probability of correctness, of the individual decisions. In other words, the output of the de-mapper 40 provided to the decoder 50 does not permit any conclusions about the closeness of the marking "X" in FIG. 2 to the associated point [1, 1] in the constellation diagram. Evidently, the operation of the decoder 50 would benefit from such probability information. Therefore, Ch. Axell and M. Brogsten suggest adopting the so-called Ramesh algorithm that also provides probability information during the de-mapping process (see sections 7.5.2 and 7.5.3).

The Ramesh algorithm uses decision boundaries as explained above but produces supplemental information about the probability of an individual decision. Specifically, the Ramesh algorithm generates for each decision (i.e., each bit of the bit sequence) an output value in the form of a signed magnitude representative of extrinsic probability information. The sign of the output value is indicative of a bit value 1 or 0, and the magnitude (i.e., the absolute value) is indicative of a distance to the applied decision boundary.

The signed magnitude output by the Ramesh algorithm constitutes extrinsic probability information for the decoder 50. This probability information, which is sometimes also referred to as "soft bit" information, significantly improves the performance of an error correction algorithm and other procedures implemented in the decoder 50.

SUMMARY

There is a need to further improve the performance of a de-mapping technique that is based on an algorithm of the Ramesh type.

According to one aspect, a method of de-mapping a point in a constellation diagram into a bit sequence is presented, wherein the de-mapping provides for each bit of the bit sequence extrinsic probability information in the form of an output value with a sign of the output value indicating a bit value and a magnitude of the output value indicating probability information in the form of a distance to a decision boundary in a constellation diagram. The method comprises receiving a signal indicative of a constellation point, wherein the constellation point represents a bit sequence having a most significant bit and at least one next significant bit, deriving a first output value for the most significant bit, receiving a priori information pertaining to the most significant bit, and deriving a second output value for the next significant bit based on the first output value, the a priori information and a decision boundary.

The a priori information may be information that is available before the de-mapping has been performed. The a priori information may be received from any process different from the de-mapping process (e.g., a decoding process). Extrinsic information may generally be considered as new information (e.g., that has not been input in the de-mapping process). The terms a priori information and extrinsic information may be used on a bit-wise granularity level in connection with the present disclosure. For example, the (extrinsic) second output value for the next significant bit may be derived taking into account a priori information pertaining to (e.g., generated for or from) the most significant bit.

Deriving the second output value may comprise modifying at least one of the first output value and the decision boundary based on the a priori information. Such a modification may comprise shifting at least one of the first output value and the decision boundary by a distance defined by the a priori information. For example, deriving the second output value may comprise a comparison of the modified first output value with the decision boundary. In another example, a comparison of the first output value with the modified decision boundary may take place.

In a similar manner, deriving the first output value may comprise comparing the received signal, or a signal derived therefrom by the de-mapper, with another decision boundary. The other decision boundary may be zero.

Generally, at least one of the decision boundaries may be parallel to an axis of the constellation diagram. This includes that at least one of the decision boundaries coincides with an axis of the constellation diagram.

In certain configurations, the methods or individual steps thereof may be performed separately for a real part and imaginary part of the received signal. In such a case, at least one of the decision boundaries may be represented by a point on an axis of the constellation diagram. Such a point may be constituted by zero.

The a priori information may stem from one or multiple processes performed upstream or downstream of the de-mapping process. As an example, the a priori information may be obtained from a decoding process (e.g., from a channel decoding process using a turbo or other code). As a further example, the a priori information may be obtained from a correlation (or de-correlation) of media frames (e.g., speech or video frames) included in the transmitted information. Still further, the a priori information may have been obtained from iterative processing or from processing one or more previous transmissions that could not be successfully decoded (e.g., in connection with an HARQ implementation).

In one variant, the a priori information takes the form of extrinsic information obtained, for example, by a decoding process. The decoding process may be performed downstream of the de-mapping process. Specifically, the decoding process may decode a bit sequence representative of the most significant bit and one or more next significant bits provided by the de-mapping process. The decoding process may comprise or be part of an HARQ scheme, optionally with one or both of FEC (de-)coding and the processing of error detection information, such as CRC bits.

The extrinsic information obtained by the decoding process may contain probability information, or "soft bit" information, generated in the decoding process. The probability information contained in the extrinsic information may take any form, e.g., a binary form or the form of a signed magnitude as provided by a Ramesh-type algorithm.

The first output value may take the form of a Log-Likelihood Ratio (LLR) value. Additionally, or as an alternative, the a priori information may take the form of an LLR value.

One or more of the method steps may be repeated with respect to a still further decision boundary pertaining to one or more further next significant bits. As such, the method may comprise receiving further a priori information pertaining to the next significant bit (together with or separately from the a priori information used for determining the decision boundary) and deriving a third output value for a further next significant bit based on the second output value, the further a priori information and the still further decision boundary. As said, the receiving and deriving steps may be repeated for one or more additional next significant bits.

The received signal may be a complex value comprising a real part and an imaginary part (e.g., an I-part and a Q-part in an I/Q plane). In such a case, the method, or individual steps thereof, may be performed separately for the real part and the imaginary part of the received signal. Specifically, at least the steps of deriving the first output value and deriving the second output value (and, optionally, any third or higher order output value) can be performed separately for the real part and the imaginary part.

The received signal may have been modulated based on any suitable modulation, or mapping, scheme. As an example, QAM (e.g., 16-QAM, 64-QAM, 256-QAM, etc.) can be mentioned here.

Further provided is a computer program product comprising program code portions for performing the steps of any of the methods and method aspects described herein when the computer program product is run on a computing device. The computer program product may be stored on a computer-readable recording medium, such as a semiconductor memory, a CD-ROM, or DVD. Furthermore, the computer program product may be provided for a download via a network connection.

Also provided is a de-mapper for de-mapping a point in a constellation diagram into a bit sequence, wherein the de-mapping provides for each bit of the bit sequence extrinsic probability information in the form of an output value with a sign of the output value indicating a bit value and a magnitude of the output value indicating probability information in the form of a distance to a decision boundary in the constellation diagram. The de-mapper comprises a first interface configured to receive a modulation symbol indicative of a constellation point, wherein the constellation point represents a bit sequence having a most significant bit and at least one next significant bit, a second interface configured to receive a priori information pertaining to the most significant bit, and at least one of a processor or circuitry configured to derive a first output value for the most significant bit, and to derive a second output value for the next significant bit based on the first output value, the a priori information and a decision boundary.

The de-mapper may be part of a stationary or mobile component. As an example, the de-mapper may be incorporated into a base station. Alternatively, the de-mapper may be incorporated into a wireless terminal. The wireless terminal may, in addition to the de-mapper, comprise a decoder coupled to the de-mapper and configured to provide the a priori information. The de-mapper and the decoder may be integrated into an OFDM receiver of the wireless terminal. The OFDM receiver may be configured to operate in accordance with the 3GPP LTE standard.

BRIEF DESCRIPTION OF THE DRAWINGS

Further aspects and advantages of the technique presented herein will become apparent from the following description of exemplary embodiments and the drawings, wherein.

DESCRIPTION OF PREFERRED EMBODIMENTS

In the following description of preferred embodiments, for purposes of explanation and not limitation, specific details are set forth to provide a thorough understanding of the present disclosure. It will be apparent to one skilled in the art that the present invention may be practised in other embodiments that depart from these specific details. For example, while the embodiments will be described in connection with a specific Ramesh-type algorithm, it will be appreciated that the present disclosure may also be practised in connection with other implementations of such an algorithm. Moreover, while the embodiments will primarily be described in the context of the 3GPP LTE standard, it will be evident that the disclosure presented herein can also be practised in connection with other communications technologies, such as WiMAX.

Those skilled in the art will further appreciate that the services, functions and steps explained herein may be implemented using software functioning in conjunction with a programmed microprocessor, one or more Application Specific Integrated Circuits (ASICs), one or more Digital Signal Processors (DSPs) or a general purpose computer. It will also be appreciated that while the following embodiments will primarily be described with reference to methods and apparatuses, the disclosure provided herein may also be embodied in a computer program product as well as in a system comprising a processor and a memory coupled to a processor, wherein the memory stores one or more programs that cause the processor to perform the services, functions and steps disclosed herein.

Figure 3A:
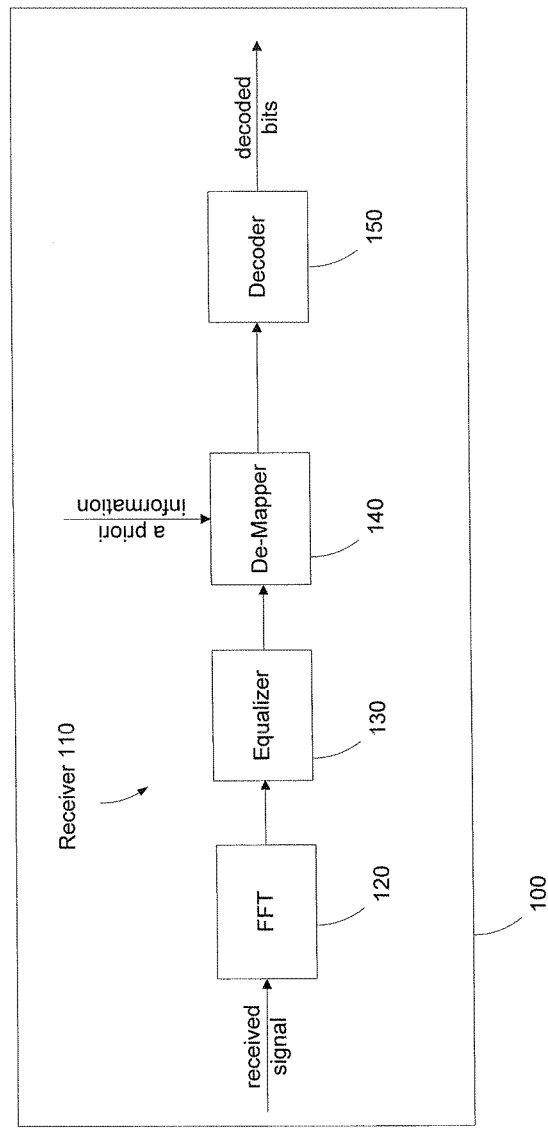
FIG. 3A shows a block diagram of a first receiver embodiment.

FIG. 3A shows a block diagram of a wireless terminal 100 that incorporates a first receiver embodiment 110. The wireless terminal 100 can be realized as a mobile telephone, smartphone, tablet computer or notebook. The receiver 110 is realized to support OFDM and operates in accordance with 3GPP LTE or any similar standard.

Figure 1:
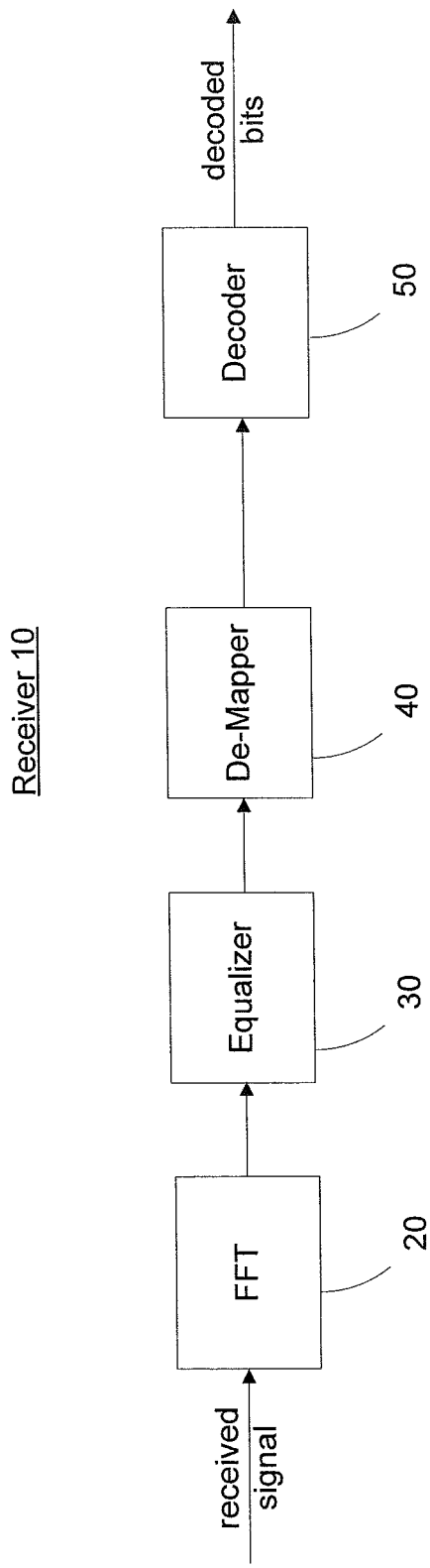
FIG. 1 shows a block diagram of an exemplary receiver.
Figure 2:
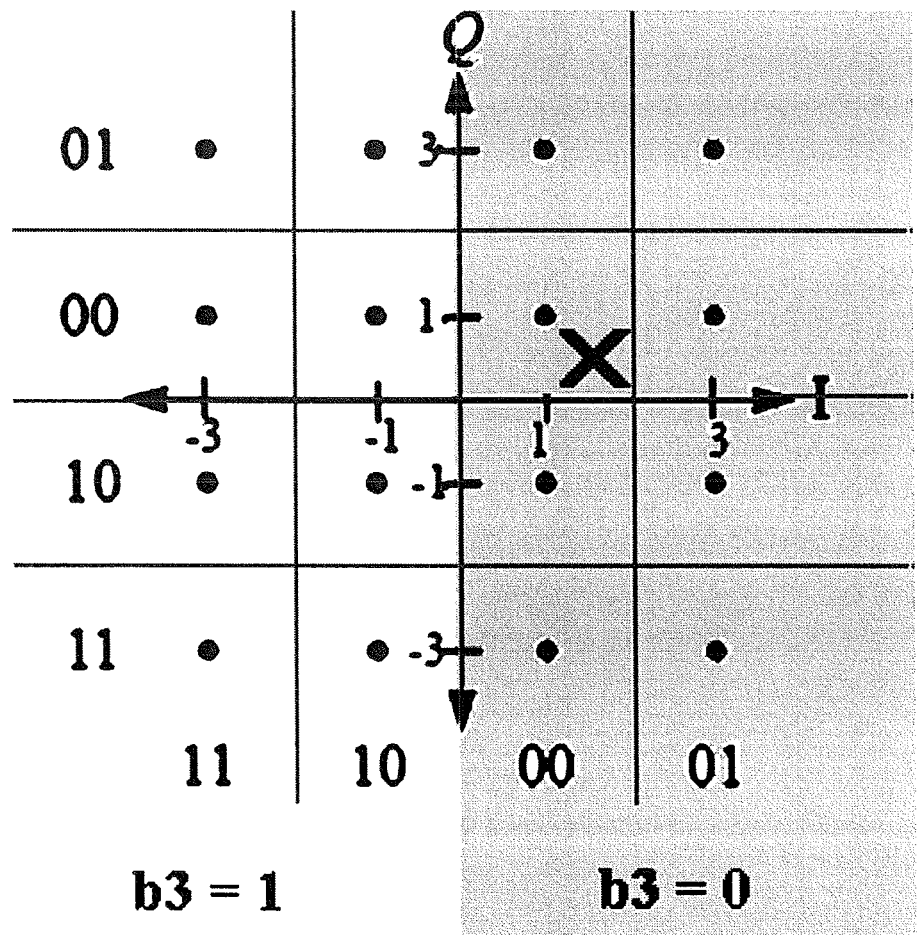
FIG. 2 schematically illustrates an I/Q plane for 16-QAM and the de-mapping of a MSB.

As illustrated in FIG. 3A, the receiver 110 comprises an FFT 120, a frequency domain equalizer 130, a de-mapper 140 as well as a channel decoder 150. The FFT 120, equalizer 130, de-mapper 140 and channel decoder 150 may generally be operated in a similar manner as the corresponding components of the OFDM receiver 10 illustrated in FIG. 1. For this reason, a detailed discussion of the FFT 120, equalizer 130 and channel de-coder 150 will be omitted, and only certain technical details of the de-mapper 140 will be described hereinafter.

The de-mapper 140 is generally adapted to receive from the equalizer 130 a signal indicative of a point in a constellation diagram and to de-map the point in the constellation diagram into a bit sequence. That de-mapping may generally result in one or multiple signed magnitudes at the output of the de-mapper 140. In other words, the de-mapper 140 may be configured to perform a de-mapping algorithm of the Ramesh type.

In more detail, the de-mapping performed by the de-mapper 140 provides for each bit of the bit sequence extrinsic probability information in the form of an output value. A sign of that output value indicates a bit value, and its magnitude indicates probability information in the form of a distance to a decision boundary in the constellation diagram.

As highlighted in FIG. 3A, the de-mapper 140 comprises an input for receiving a priori information. This a priori information may be received from various sources of information. In one example, that will be discussed in more detail with reference to FIGS. 3B and 3C, the a priori information is generated by and received from the channel decoder 150. In other embodiments, the a priori information may be received from a source of information different from the channel decoder 150 or may even locally be generated and, for example, buffered by the de-mapper 140.

As an example, if the transmitted information included in the signal received by the wireless terminal 100 stems from a speech or video encoder, the speech or video encoded bits are typically correlated from one speech or video frame to the next speech or video frame. This correlation can be analyzed to create a priori information that is then fed to the de-mapper 140 as shown in FIG. 3A.

As another example, the a priori information may have been derived on the basis of iterative processing or from one or multiple previous transmissions of the same or similar information. In an exemplary LTE HARQ scenario, the decoding of an initial transmission by the decoder 150 may have failed. In such a case, LTE HARQ defines that the input signal of the decoder 150 for the failed transmission (i.e, the extrinsic probability information received by the decoder 150 for the failed transmission from the de-mapper 140) should be buffered. The buffered extrinsic probability information will then be combined with the extrinsic probability information of one or more re-transmissions to increase the performance of the decoder 150.

However, the extrinsic information thus buffered for an initial transmission at, for example, the channel decoder 150 may also be fed back to the de-mapper 140 in the form of a priori information to be exploited in connection with de-mapping a re-transmission. Of course, it would also be possible to buffer the extrinsic probability information of an initial transmission locally at the de-mapper 140 or in a separate buffer component for increasing the de-mapping performance of one or more re-transmissions may follow.

Figure 3B:
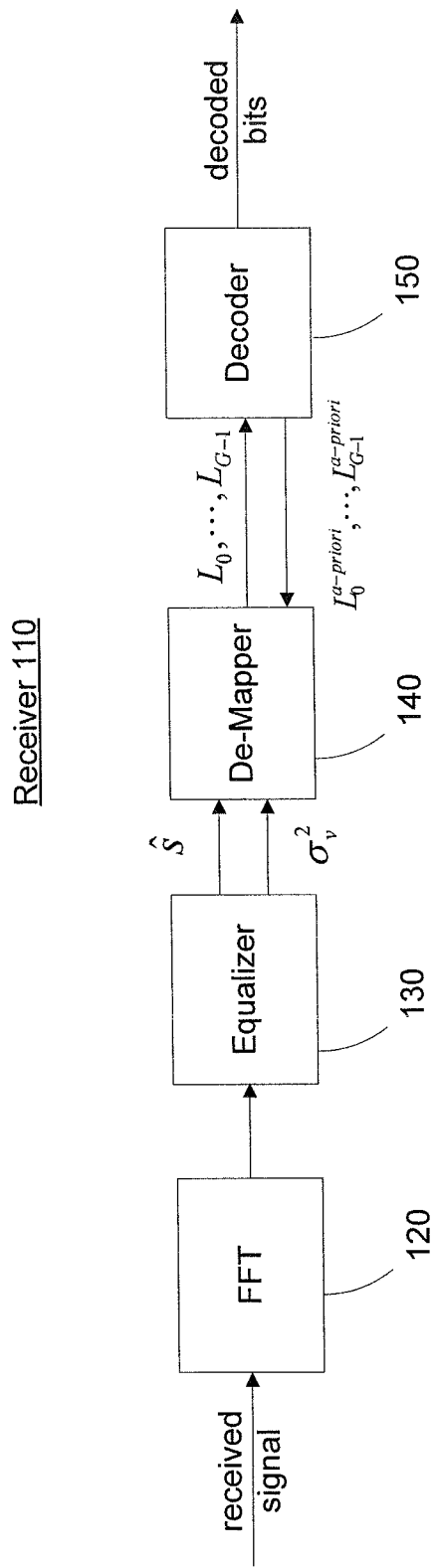
FIG. 3B shows a block diagram of a second receiver embodiment.

FIG. 3B illustrates another embodiment of the de-mapper 140 that is based on the embodiment illustrated in FIG. 3A and the example in which the a priori information fed to the de-mapper 140 is received from the channel decoder 150. In the following, the configuration, the input and output parameters, and the operation of the de-mapper 140 of FIG. 3B will be described in more detail.

Figure 3C:
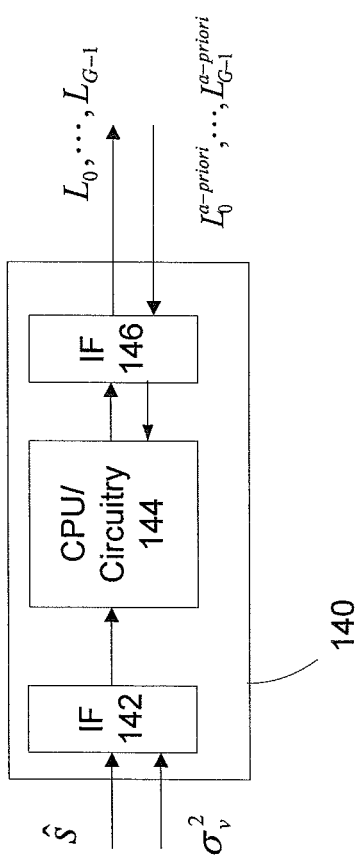
FIG. 3C shows a block diagram of a de-mapper embodiment.

FIG. 3C illustrates internal components of the de-mapper 140 of FIG. 3B. As shown in FIG. 3C, the de-mapper 140 comprises a first interface 142 coupled to the equalizer 130, a Central Processing Unit (CPU) or dedicated circuitry 144 as well as another interface 145 coupled to the decoder 150. The interface 142 is configured to receive a noise symbol observation as well as a noise variance parameter from the equalizer 130 and to forward same to the CPU or circuitry 144. The interface 146 is configured to receive from the channel decoder 150 a priori information at least for the MSB and to forward the a priori information to the CPU or circuitry 144. In the present case, the a priori information received from the decoder 150 is extrinsic information. For example, such extrinsic information can be derived from exploiting code (e.g. turbo code) properties. The interface 146 is further configured to provide extrinsic probability information to the decoder 150.

In the following, a general formulation for the un-modified Ramesh algorithm will be presented first. Lets be the received signal in the form of a noisy symbol observation as, for example, obtained when transmitting information over a wireless point-to-point communication link under an Additive White Gaussian Noise, AWGN, condition, i.e., $$\hat{s} = s + \upsilon$$

$s \in \mathcal{A}$ is the complex transmit symbol, where $\mathcal{A}$ set represents a finite symbol constellation or alphabet (e.g., 16-QAM or 64-QAM). It is assumed that the relation between a specific bit sequence and neighboring symbols is defined in accordance with Gray mapping, i.e., bit sequences associated with neighboring symbols distinguish by only a single bit.

$\upsilon \in \mathbb{C}$ is zero mean Gaussian noise with variance $\sigma_\upsilon^2$, i.e. $\upsilon \sim CN(0, \sigma_\upsilon^2)$ In order to obtain the extrinsic probability information as required for, for example, turbo decoding by the channel decoder 150, the noisy symbol has to be de-mapped by the de-mapper 140. As a practical low complexity solution a modified Ramesh algorithm that is based on the one described in the document by Ch. Axell and M. Brogsten can be applied by the de-mapper 140.

Let e.g. g denote the bit index with respect to the bit sequence of length G associated with the real or imaginary part of a received symbol. Then the output value of the de-mapper 140 corresponding to the MSB (g=0) of the real part is given by $$L_{0,\Re} = \frac{4 \cdot \Re\{\hat{s}\}}{\sigma_\upsilon^2 \cdot \sqrt{M}}$$

with $$M = \frac{2}{3}(2^{2G} - 1)$$

The remaining bits can be derived by the recursive rule $$L_{g,\Re} = \frac{2^{G-g+2}}{\sigma_\upsilon^2 \cdot M} - \text{sgn}(L_{g-1,\Re}) \cdot L_{g-1,\Re}$$
$$= \frac{2^{G-g+2}}{\sigma_\upsilon^2 \cdot M} - |L_{g-1,\Re}|$$

De-mapping of the imaginary part is equivalently dealt with.

It should be noted that the absolute operation in the above equation can be understood as "hard bit" decision depending on the sign of the previous level output value. As an example, FIG. 4A depicts the decision process and decision tree for the extrinsic soft bit de-mapping of the real part of 64-QAM modulated symbols.

Figure 4A:
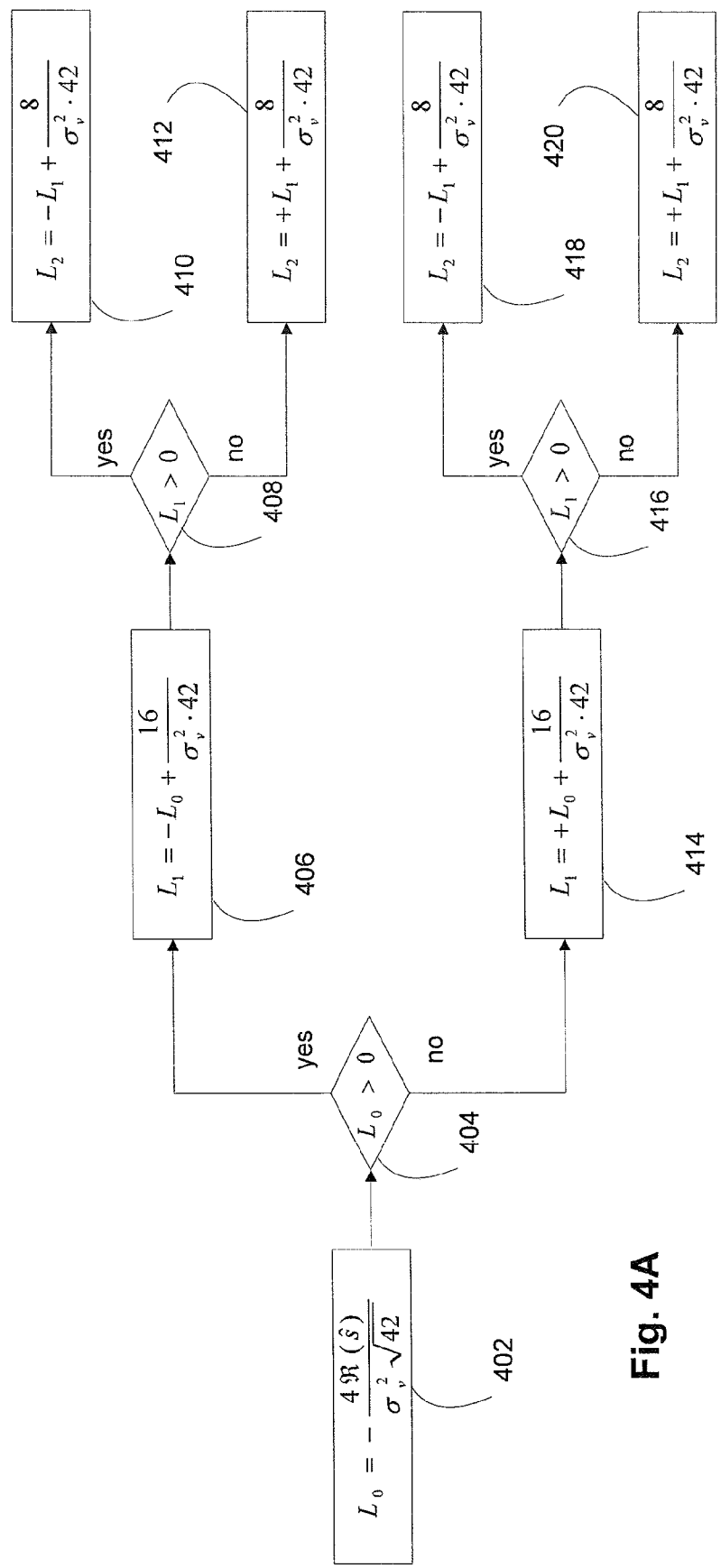
FIGS. 4A, 4B schematically illustrate an exemplary decision process based on a Ramesh-type de-mapping algorithm.

With reference to FIG. 4A, the output value $L_0$ for the MSB is calculated in step 402. For calculation of the output value for the next significant bit $L_1$, a decision process is made in step 404 depending on the sign of the output value $L_0$ obtained for the MSB. Depending on the result of the decision process in step 404, the output value L1 for the next significant bit is calculated either in step 406 or in step 414. Following the decision process as in step 404 for $L_0$, a similar decision process for $L_1$ is performed in step 408 or step 416, to then calculate a third output value for the further next significant bit $L_2$ in either one of steps 410, 412, 418 or 420.

As said, the decision processes in steps 404, 408 and 416 can be regarded as "hart bit" decisions as will now be discussed in detail with respect to an exemplary 16-QAM scenario illustrated in FIG. 4B.

For determining the output value $L_0$ for the MSB, the observation in the I/Q plane is assessed with respect to a first decision boundary defined by the Q axis (I=0) in the I/Q plane. The corresponding output value $L_0$ will, in accordance with the Ramesh algorithm, be a signed magnitude. The sign is indicative of whether the observation lies in the positive sign half plane or the negative sign half plane of the I/Q plane as shown in FIG. 4B. The magnitude, on the other hand, indicates the distance to the decision boundary I=0 in the I/Q plane.

Figure 4B:
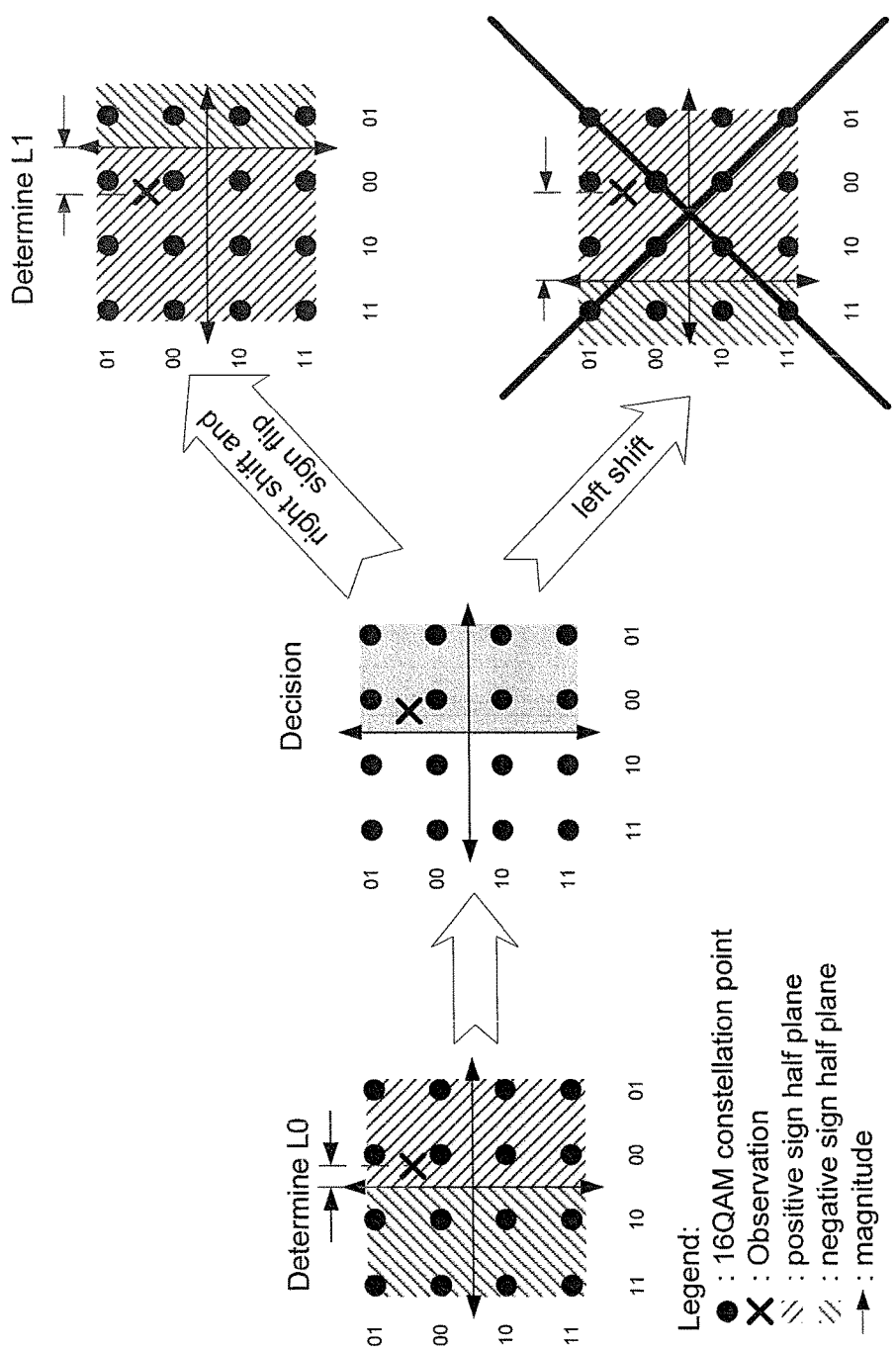

Once the output value $L_0$ for the MSB has been determined, a decision process similar to step 404 in FIG. 4A is performed as illustrated on the right-hand side of FIG. 4B for calculating the output value $L_1$ for the next significant bit. The result of that decision process depends on whether the observation lies in the positive sign half plane or the negative sign half plane of the I/Q plane. In the exemplary scenario illustrated in FIG. 4B, where the observation lies in the positive sign half plane, a new decision boundary is then determined by a right shift of the previous decision boundary and a sign flip. The output value for the next significant bit $L_1$ is determined on the basis of the shifted decision boundary and the sign-flipped output value $L_0$ for the MSB in a similar manner as indicated in step 406 of FIG. 4A for 64-QAM.

It will be appreciated that the procedures illustrated in FIGS. 4A and 4B will also be performed for the imaginary part of the observation in a similar manner but using decision boundaries coinciding with or parallel to the I axis in the I/Q plane.

In the scenarios illustrated in FIGS. 4A and 4B, the output values $L_1, L_2, \ldots$ for one or more next significant bits following the MSB are calculated in a similar manner as the output value $L_0$ of the MSB. It has been found that the reliability of processing operations downstream of the de-mapper 140, such as of the channel decoder 150, will benefit when taking into account a priori information upon calculating the output values $L_1, L_2, \ldots$ for the next significant bits. To this end, the de-mapper 140 of FIG. 3B is configured to receive a priori information $L^{a\ priori}$ pertaining to the most significant bit and, optionally, one or more next significant bits from the channel decoder 150.

The CPU or circuitry 144 of the de-mapper 140 is configured to derive the output value $L_0$ for the MSB based on a first decision boundary, and one or more further output values for one or more next significant bits based on associated further decision boundaries, output values for preceding bits and the a priori information $L^{a\ priori}$. For example, the output value $L_1$ for the next significant bit following the MSB is derived based on the output value $L_0$ for the MSB, the a priori information $L_0^{a\ priori}$ received from the channel decoder 150 for the MSB, and a second decision boundary.

Generally, starting from the MSB, output values for the remaining bits are calculated recursively by the two steps
   Calculate output value (LLR) of actual bit
   Determine the rule of the subsequent calculation by evaluating the sign of the actual output value and a priori information from the channel decoder 150

Revisiting FIG. 4A, apparently the MSB output value $L_0$ (associated with bit level g=0) is completely independent of any other bit decision, whereas the output values $L_1$, $L_2$, . . . associated with the remaining, less significant bits (g>0) recursively depend on the intrinsic bit decisions of the more significant bits. It is thus proposed to take not only into consideration the intrinsic but also a priori bit information of the lower level for the decision process.

Let, for example, $L_g^{a\ priori}$ be the extrinsic LLR provided by the channel decoder 150, where subscript g relates to the bit index of the bit sequence keyed by one symbol. To improve the criterion at the decision steps of FIGS. 4A and 4B, it is suggested to sum up intrinsic output values and a priori information values and to use the sum term for comparison against zero (instead of only using the intrinsic information as in FIGS. 4A and 4B). Hence, the recursive update rule of the conventional Ramesh algorithm mutates into $$L_{g,\Re} = \frac{2^{G-g+2}}{\sigma_v^2 \cdot M} - \text{sgn}\left(L_{g-1,\Re} + L_{g-1,\Re}^{a-priori}\right) \cdot L_{g-1,\Re}$$

Figure 5A:
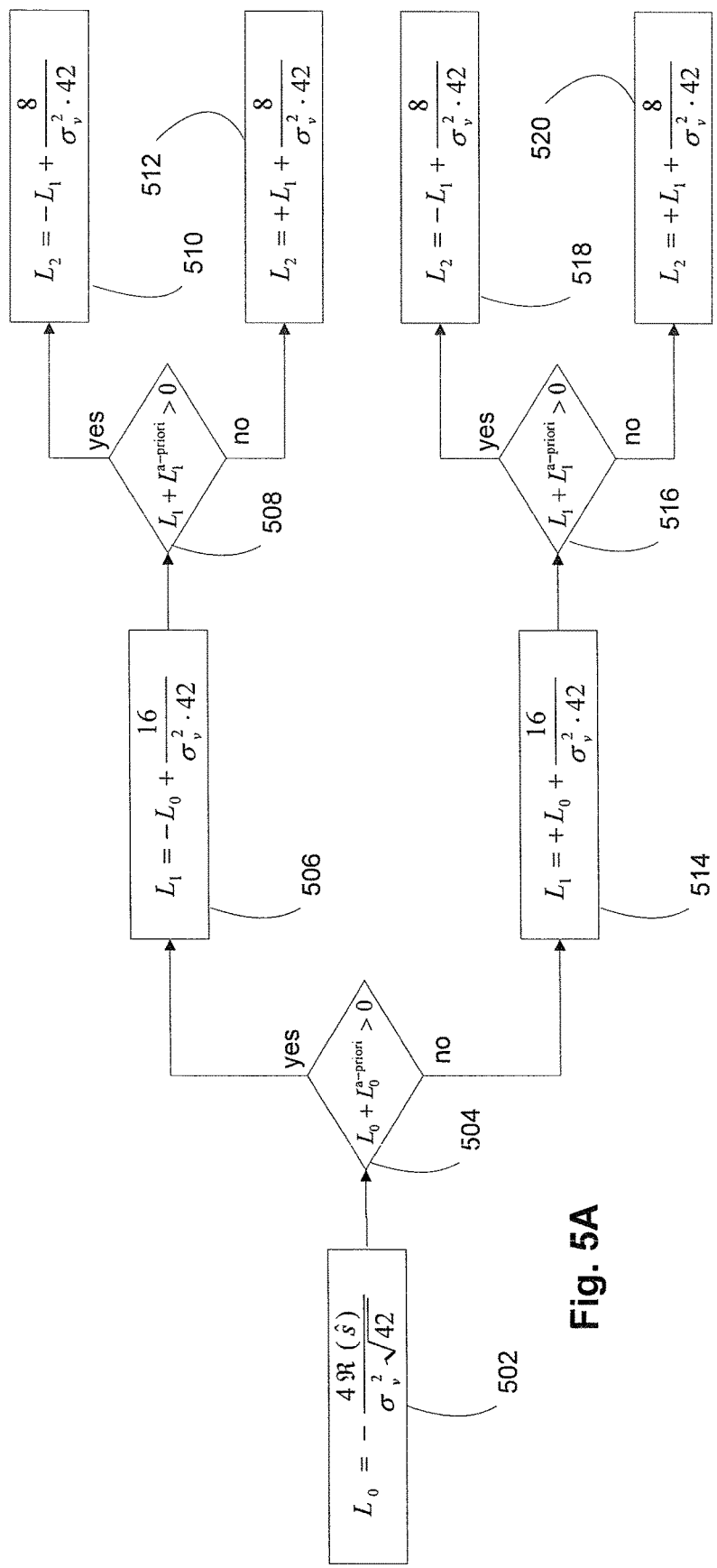
FIGS. 5A, 5B schematically illustrate an embodiment of a decision process based on a Ramesh-type de-mapping process.

The decision tree of the modified approach suggested herein is depicted in FIG. 5A. Steps 502 to 520 illustrated in the decision tree of FIG. 5A generally correspond to the associated steps illustrated in FIG. 4A for the conventional Ramesh algorithm. However, as indicated for decision steps 504, 508 and 516, the a priori information received from the channel decoder 150 is additionally taken into account in the associated decision processes.

Specifically, in decision step 504, the output value $L_0$ for the MSB is modified based on the a priori information $L_0^{a\ priori}$ before being compared with the decision boundary I=0. That is, the "intrinsic" output value $L_0$ and the value of the associated "extrinsic" a priori information $L_0^{a\ priori}$ derived by the decoder 150 for the MSB are summed up before the boundary decision (sign evaluation) in step 504. Of course, instead of modifying the output value $L_0$ in step 504, based on the a priori information $L_0^{a\ priori}$, the associated decision boundary could alternatively be modified (i.e., shifted) by the negative amount of $L_0^{a\ priori}$.

As shown in FIG. 5A, the further decision steps 508 and 516 are modified in a similar manner as the decision step 504. That is, the intrinsic output value $L_1$ for the next significant bit is modified in steps 508 and 516 by an amount defined by the extrinsic a priori information $L_1^{a\ priori}$ generated by the channel decoder 150 for that bit.

Figure 5B:
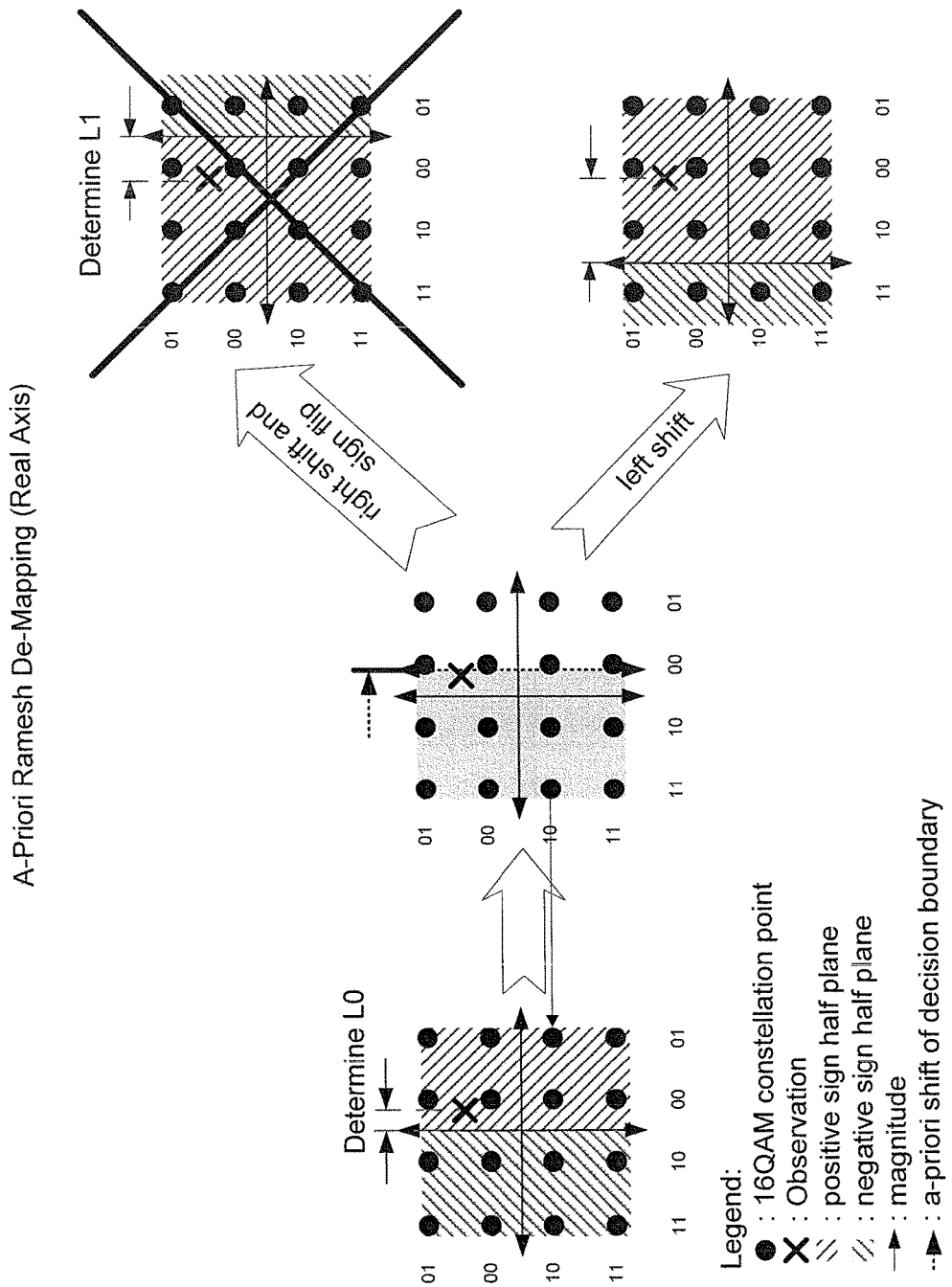

While the decision tree of FIG. 5A illustrated the modification of the Ramesh algorithm presented herein for a 64-QAM scenario, the diagram of FIG. 5B highlights the differences with respect to the conventional Ramesh algorithm in comparison to the 16-QAM diagrams of FIG. 4B. As shown in the middle of FIG. 5B, the consideration of the a priori information in the decision process can be visualized by an a priori shift of the decision boundary (see dashed arrow).

The shift of the decision boundary due to the consideration of the additional a priori information can significantly affect the outcome of the decision process and the following calculation of the output value $L_1$ of the next significant bit. While, in the scenario of FIG. 4B, the decision resulted in a calculation of $L_1$ in accordance with the upper branch, the decision process of FIG. 5B based on the additional a priori information led to the lower calculation branch. As such, the consideration of additional a priori information as illustrated in FIGS. 5A and 5B may lead to opposite bit values compared to a scenario as in FIGS. 4A and 4B, in which the a priori information is not considered.

The suggested modification of the conventional Ramesh algorithm is rather incomplex and causes only a very low increase of computational complexity. The output values are by nature extrinsic such that subtraction of a priori LLRs is not necessary.

It is believed that many advantages of the present disclosure will be fully understood from the description above, and it will be apparent that various changes may be made in the form, construction and arrangement of the exemplary aspects thereof without departing from the scope of the invention, or without sacrificing all of its advantages. Because the invention can be varied in many ways, it will be recognized that the invention should be limited only by the scope of the claims that follow.

The invention claimed is:

1. A method of de-mapping a point in a constellation diagram into a bit sequence, wherein the de-mapping provides, for each bit of the bit sequence, extrinsic probability information in the form of an output value, with a sign of the output value indicating a bit value and a magnitude of the output value indicating probability information in the form of a distance to a decision boundary in the constellation diagram, the method comprising:
   receiving a signal indicative of a constellation point, wherein the constellation point represents a bit sequence having a most significant bit and at least one next significant bit;
   deriving a first output value ($L_0$) for the most significant bit;

receiving a priori information ($L_0^{a\ priori}$) for the most significant bit; and deriving a second output value ($L_1$) for the next significant bit based on the first output value ($L_0$), the a priori information and a decision boundary, wherein deriving the second output value comprises modifying at least one of the first output value and the decision boundary based on the a priori information, and wherein deriving the second output value further comprises one of a comparison of the modified first output value with the decision boundary and a comparison of the first output value with the modified decision boundary.

2. The method of claim 1, wherein modifying at least one of the first output value and the decision boundary comprises shifting at least one of the first output value and the decision boundary by a distance defined by the a priori information.

3. The method of claim 1, wherein deriving the first output value comprises comparing the received signal with another decision boundary.

4. The method of claim 3, wherein the another decision boundary is zero.

5. The method of claim 1, wherein at least one of the decision boundary and the another decision boundary is parallel to an axis of the constellation diagram.

6. The method of claim 1, wherein the method is performed separately for a real part and an imaginary part of the received signal.

7. The method of claim 1, wherein the a priori information is obtained by a decoding process.

8. The method of claim 1, wherein the a priori information takes the form of extrinsic information.

9. The method of claim 1, wherein the a priori information is obtained for a re-transmission from a previous transmission.

10. The method of claim 1, wherein at least one of the first output value and the a priori information takes the form of a log-likelihood ratio value.

11. The method of claim 1, further comprising:
receiving further a priori information for the next significant bit; and
deriving a third output value for a further next significant bit based on the second output value, the further a priori information and a still further decision boundary.

12. The method of claim 11, wherein the receiving and deriving steps are repeated for one or more additional next significant bits.

13. The method of claim 1, wherein the received signal has been modulated in accordance with Quadrature Amplitude Modulation (QAM).

14. A non-transitory computer-readable medium comprising, stored thereupon, a computer program product comprising program code portions for, when the computer program product is run on a computing device:
de-mapping a point in a constellation diagram into a bit sequence, wherein the de-mapping provides, for each bit of the bit sequence, extrinsic probability information in the form of an output value, with a sign of the output value indicating a bit value and a magnitude of the output value indicating probability information in the form of a distance to a decision boundary in the constellation diagram, and wherein the de-mapping comprises:
receiving a signal indicative of a constellation point, wherein the constellation point represents a bit sequence having a most significant bit and at least one next significant bit;
deriving a first output value ($L_0$) for the most significant bit;
receiving a priori information ($L_0^{a\ priori}$) for the most significant bit; and
deriving a second output value ($L_1$) for the next significant bit based on the first output value ($L_0$), the a priori information and a decision boundary, wherein deriving the second output value comprises modifying at least one of the first output value and the decision boundary based on the a priori information, and wherein deriving the second output value further comprises one of a comparison of the modified first output value with the decision boundary and a comparison of the first output value with the modified decision boundary.

15. A de-mapper apparatus for de-mapping a point in a constellation diagram into a bit sequence, wherein the de-mapping provides for each bit of the bit sequence extrinsic probability information in the form of an output value with a sign of the output value indicating a bit value and a magnitude of the output value indicating probability information in the form of a distance to a decision boundary in the constellation diagram, the de-mapper comprising:
a first interface circuit configured to receive a signal indicative of a constellation point, wherein the constellation point represents a bit sequence having a most significant bit and at least one next significant bit;
a second interface circuitry configured to receive a priori information for the most significant bit; and
at least one of a processor and circuitry, configured to derive a first output value for the most significant bit, and to derive a second output value for the next significant bit based on the first output value, the a priori information and a decision boundary, wherein deriving the second output value comprises modifying at least one of the first output value and the decision boundary based on the a priori information, and wherein deriving the second output value further comprises one of a comparison of the modified first output value with the decision boundary and a comparison of the first output value with the modified decision boundary.

16. A wireless terminal, comprising the de-mapper of claim 15 and further comprising a decoder circuit coupled to the de-mapper and configured to provide the a priori information.

17. The wireless terminal of claim 16, wherein the de-mapper and the decoder are integrated in an Orthogonal Frequency Division Multiplex (OFDM) receiver of the wireless terminal.

* * * * *